(12) United States Patent
Vargantwar et al.

(10) Patent No.: US 9,307,561 B2
(45) Date of Patent: Apr. 5, 2016

(54) ENHANCED CONNECTION ADMISSION CONTROL PROCESS

(71) Applicant: Verizon Patent and Licensing Inc., Arlington, VA (US)

(72) Inventors: Sachin Vargantwar, Cumming, GA (US); Rodrigo Teliaken Rodelas, Alpharetta, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 96 days.

(21) Appl. No.: 14/341,204

(22) Filed: Jul. 25, 2014

(65) Prior Publication Data

US 2016/0029349 A1 Jan. 28, 2016

(51) Int. Cl.
*H04W 74/08* (2009.01)
*H04W 74/00* (2009.01)
*H04W 76/02* (2009.01)
*H04W 28/02* (2009.01)
*H04W 72/04* (2009.01)

(52) U.S. Cl.
CPC ...... *H04W 74/0833* (2013.01); *H04W 28/0236* (2013.01); *H04W 72/04* (2013.01); *H04W 74/004* (2013.01); *H04W 74/006* (2013.01); *H04W 74/008* (2013.01); *H04W 76/02* (2013.01)

(58) Field of Classification Search
None
See application file for complete search history.

(56) References Cited

U.S. PATENT DOCUMENTS

2013/0301541 A1* 11/2013 Mukherjee et al. ............ 370/329
2015/0282214 A1* 10/2015 Lee et al. ...................... 370/329

* cited by examiner

Primary Examiner — Ashley Shivers

(57) ABSTRACT

An evolved node B receives a random access preamble from a mobile device and determines if utilization exceeds a threshold. Upon determining utilization exceeds the threshold, the eNodeB sends a random access response including a backoff indicator and a modified uplink grant indicating that the mobile device can override the backoff indicator if the connection request is part of a voice over long term evolution call.

20 Claims, 4 Drawing Sheets

| | | |
|---|---|---|
| R | Timing Advance Command 402 | Octet 1 |
| Timing Advance Command 402 | UL Grant 403 | Octet 2 |
| UL Grant 403 | | Octet 3 |
| UL Grant 403 | | Octet 4 |
| Temporary C-RNTI 404 | | Octet 5 |
| Temporary C-RNTI 404 | | Octet 6 |

| | | | |
|---|---|---|---|
| R | Timing Advance Command 402 | | 405 |
| Timing Advance Command 402 | UL Grant 403' | override bit |
| UL Grant 403' | | |
| UL Grant 403' | | |
| Temporary C-RNTI 404 | | |
| Temporary C-RNTI 404 | | |

401

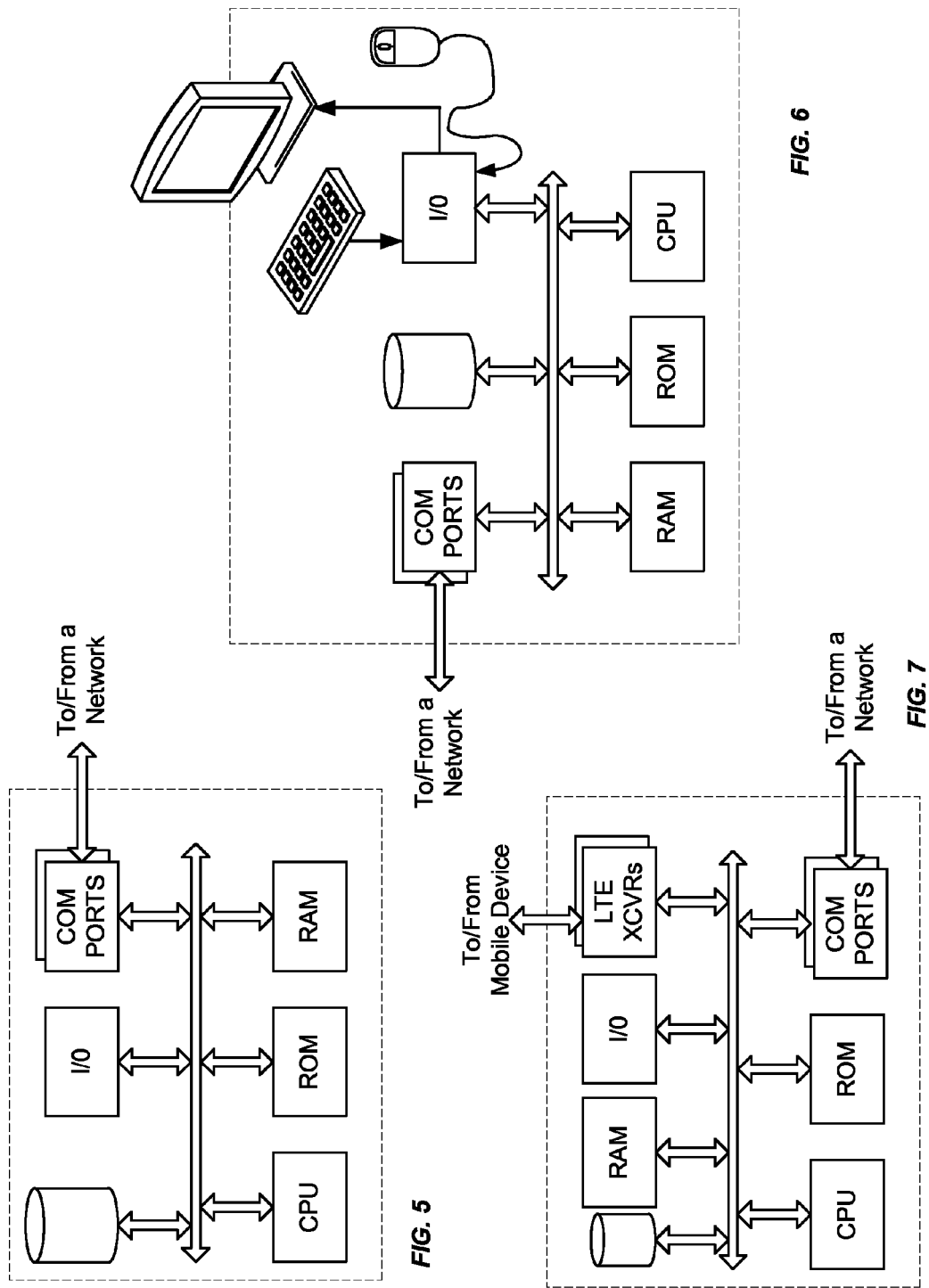

ENHANCED CONNECTION ADMISSION CONTROL PROCESS

BACKGROUND

In recent years, mobile wireless communications have become increasingly popular. Currently, mobile networks are operational that conform with the fourth generation (4G) standards, such as the Long Term Evolution (LTE) standard. These mobile networks provide voice communication, messaging, email and internet access (for example) by using radio frequency communication. Increasingly, mobile network operators are deploying Voice over LTE (VoLTE) capabilities within their mobile networks. VoLTE utilizes data packets to deliver a voice call between a mobile device and the mobile network. Similar transport is used for other real-time communications such as video phone calls.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 provides a block diagram of a general purpose computer hardware platform that may be configured as a host or server, for example, to function as any of the server computers or wireless network nodes shown in FIG. 1.

FIG. 6 is a simplified functional block diagram of a personal computer or other work station or user terminal device.

FIG. 7 is a simplified functional block diagram of a wireless network node, such as an evolved node B found in the system of FIG. 1.

DETAILED DESCRIPTION OF EXAMPLES

Figure 1:
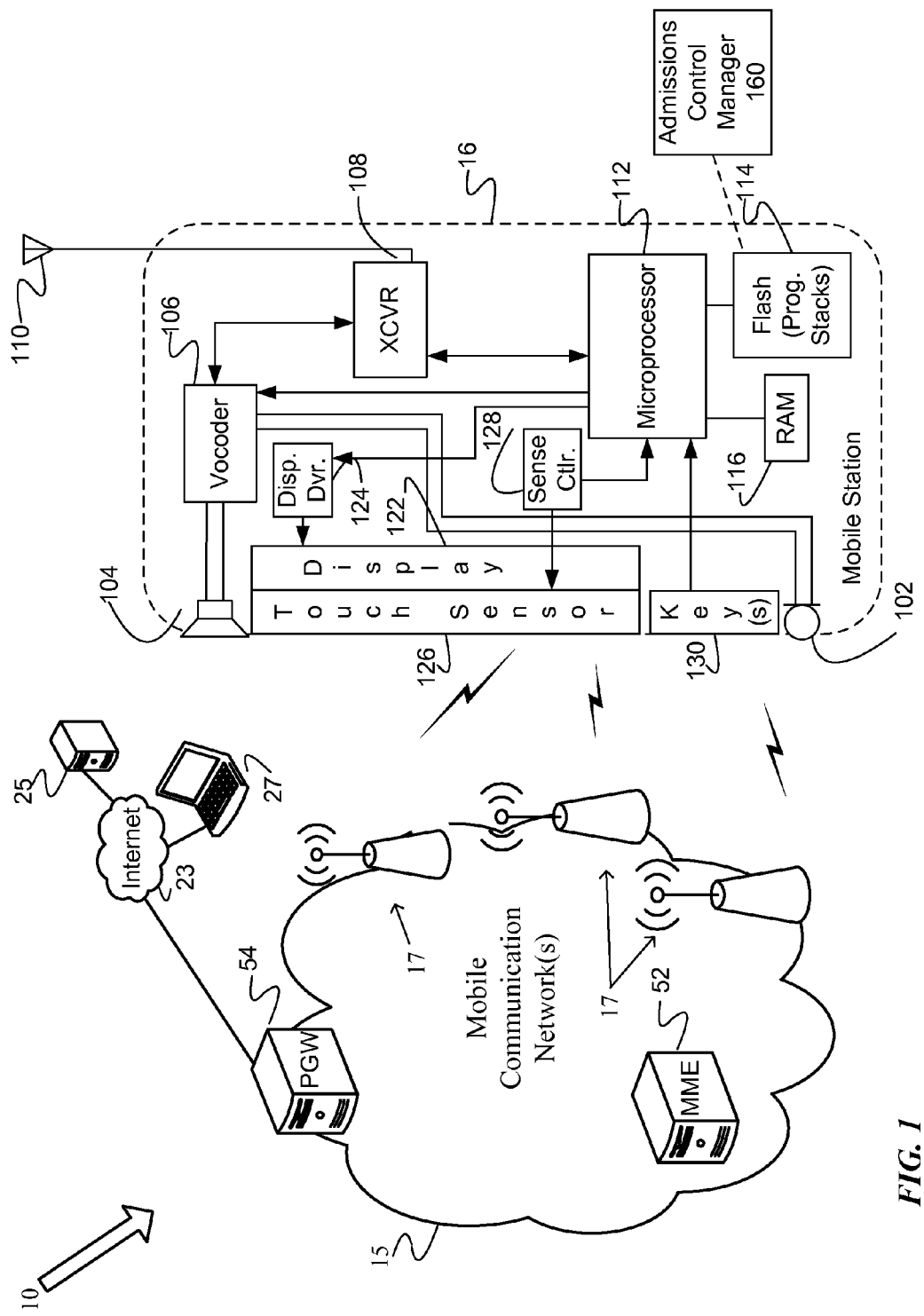
FIG. 1 is a high-level functional block diagram of an example of a system of networks/devices that provide various communications for a mobile device and support an example of connection admission control.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described in detail below relate to techniques for processing admission control for connections between a mobile device and a wireless network node in a mobile wireless communications network utilizing long term evolution (LTE). In one example, a user of a mobile device desires to establish a connection between the mobile device and a wireless network node (e.g., evolved node B (eNodeB)) in order to exchange data through a mobile wireless communications network utilizing LTE. The data to be exchanged is, in this example, voice, video and/or other delay sensitive real-time data, such as voice over LTE (VoLTE). Because all traffic in the LTE network is formed into data packets in this example, the LTE network, and in particular the wireless network node, is not able to distinguish between a connection supporting a specific type of communications that may require special treatment or priority (e.g., VoLTE) and any other data connection (e.g., web page request, e-mail, etc.) when the mobile device first establishes the connection with the wireless network node of the LTE network. Instead, the LTE network, and in particular the wireless network node, waits until the mobile device is connected to the wireless network node and the mobile device subsequently signals to the wireless network node that the connection supports a specific type of communication (e.g., VoLTE) in order for the LTE network to establish a priority path through the LTE network for the connection.

In a further example, however, utilization of the wireless network node exceeds a threshold. Utilization refers to the number of mobile devices connected and/or requesting a connection to the wireless network node as well as the availability of radio resources to service those mobile devices. As the number of mobile devices connected and/or requesting a connection to the wireless network node increases, the wireless network node's ability to service additional connections, for example, is diminished due to limited radio resources. In this further example, when the mobile device attempts to connect to the wireless network node (e.g., in order to place a voice call), the wireless network node determines that the node has exceeded the utilization threshold and informs the mobile device that the mobile device should "backoff" or wait until a later time before attempting to connect again. While other data communications may be more tolerant of such a delay in connecting, real time exchange of live voice and/or video communications (e.g., a voice and/or video call) is sensitive to latency and/or variations in delay and such a delay in connecting may cause such real time communications to fail. Such real time exchange of live voice and/or video communications, in this further example, is a priority of the LTE network and at least a best effort should be made to ensure such real time communications do not fail.

Thus, what is needed are processes and equipment that allow enhanced admissions control for connections supporting a specific type of communications. In particular, a wireless network node of an LTE network informs a mobile device that utilization of the network node exceeds a threshold and that the mobile device should backoff, but also provides the mobile device an indication that the mobile device may override the backoff as well as the necessary information to complete the connection, if the connection supports a specific type of communications (e.g., VoLTE).

Reference now is made in detail to the examples illustrated in the accompanying drawings and discussed below. FIG. 1 is a functional block diagram of an example of a system 10 of networks/devices that provide various communications for a mobile device and support an example of enhanced VoLTE admission control.

FIG. 1 illustrates a system 10 offering a variety of mobile communication services, including communications for establishing VoLTE calls by mobile device users. The example shows simply a mobile device 16 as well as a mobile communication network 15. The mobile device 16 is an example of a mobile device that may utilize VoLTE during a call. However, the network will provide similar communications for many other similar users as well as for mobile devices/users that do not utilize VoLTE during a call. The network 15 provides mobile wireless communications services to the mobile device 16 as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

A carrier offering long term evolution (LTE) and voice over LTE (VoLTE) mobile services operates a network having equipment forming a portion of the network supporting LTE services. Although various network architectures may be used to form the network, the drawing shows an arrangement using network 15 operated by one mobile carrier. Hence, the illustrated system example includes a mobile communication network 15, in this case, operated in accordance with 4G LTE standards. Mobile network 15 may provide mobile telephone communications as well as Internet data communication services. For example, mobile network 15 may connect to the public switched telephone network (PSTN, not shown) and public packet-switched data communication networks such as the Internet 23 via packet data gateway (PGW) 54. Data communications via mobile network 15 provided for users of mobile devices 16 may support a variety of services such as communications of text and multimedia messages, e-mail, web browsing, streaming or downloading content, etc. with network connected equipment such as a server 25 and/or laptop computer 27 in the drawing. Voice and/or video communication also may involve transport via the Internet 23 using voice over Internet Protocol (VoIP) technologies and/or via network 15 using VoLTE technologies.

The mobile communication network 15 is implemented by a number of interconnected networks. Hence, the overall network 15 includes a number of wireless access networks, as well as regional ground networks interconnecting a number of wireless access networks and a wide area network (WAN) interconnecting the regional ground networks to core network elements. A regional portion of the network 15, such as that serving mobile device 16, can include one or more wireless access networks and a regional packet switched network and associated signaling network facilities.

Physical elements of a wireless access network operated by a mobile carrier include a number of base stations represented in the example by the base stations (BSs) 17. Although not separately shown, such a base station 17 includes a wireless transceiver, which can communicate via an antennae system at the site of base station and over the airlink with one or more of the mobile devices 16, when the mobile devices are within range. Each base station can include a wireless transceiver coupled to several antennae mounted on a radio tower within a coverage area often referred to as a "cell." The wireless transceiver is the part of the radio network that sends and receives RF signals to/from the mobile devices 16 that are served by the base station 17. Although referred to here generically using the term base stations, these radio access points on the edge of the network may be referred to by other terms. In a 4G LTE network implementation, for example, the base stations are implemented by equipment identified as eNodeBs.

The wireless access networks can also include a traffic network represented generally by the cloud at 15, which carries the user communications and data for the mobile devices 16 between the base stations 17 and other elements with or through which the mobile devices communicate. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 15 and other networks (e.g., the public switched telephone network (PSTN) and the Internet 23) either directly or indirectly.

Figure 2:
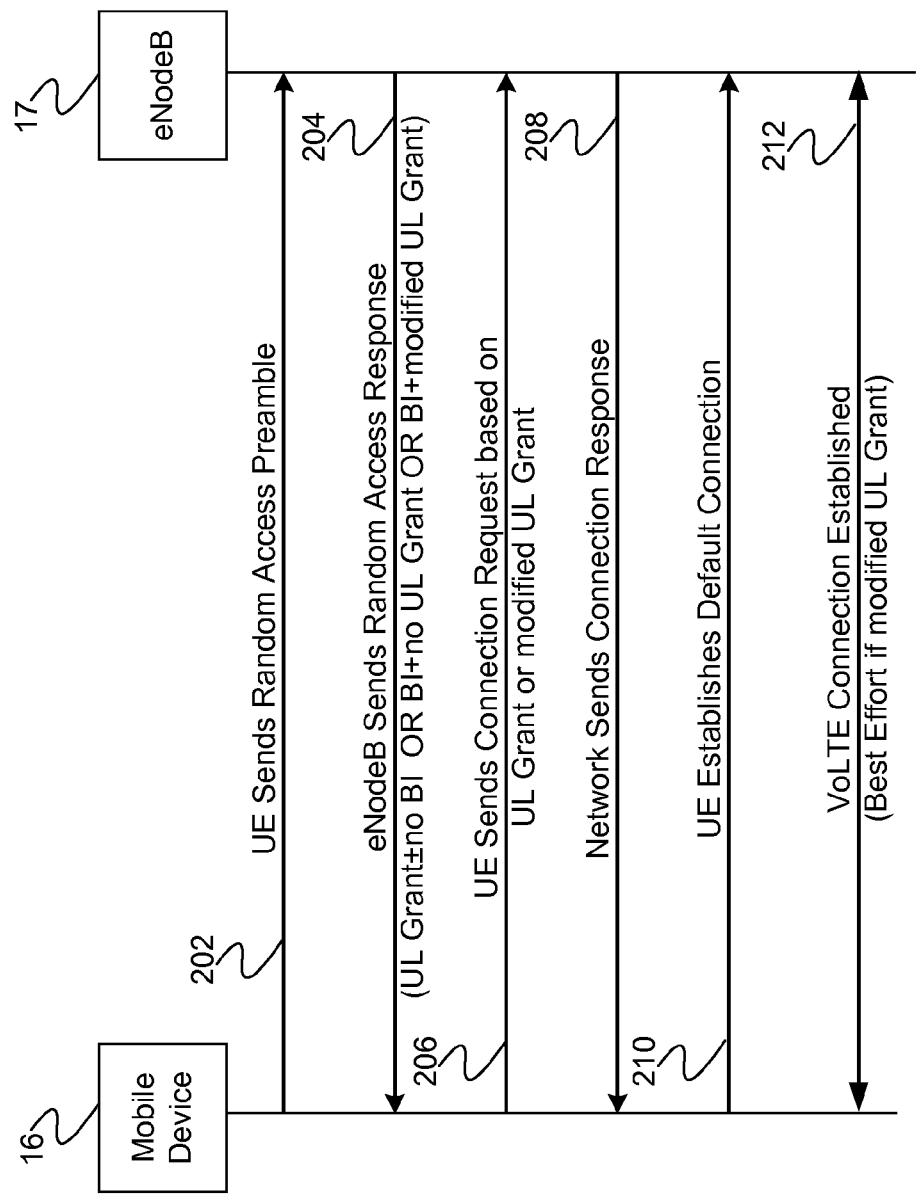
FIG. 2 is a flow diagram of an example of messages exchanged between a mobile device and a wireless network node, such as those found in the system of FIG. 1, for example, for a voice over long term evolution (VoLTE) call.

Mobile network 15 includes one or more mobility management entities (MMES) 52 which interact with mobile device 16 to manage establishment of VoLTE calls and other LTE data connections, such as described in greater detail in relation to FIG. 2. In the LTE network 16, the MME 52 provides control and management functionality.

It may be useful to consider the functional elements/aspects of an example of mobile device 16, at a high-level.

For purposes of such a discussion, FIG. 1 provides a block diagram illustration of an example of a touch screen type mobile device 16. Although the mobile device 16 may be a smartphone or may be incorporated into another device, such as a personal digital assistant (PDA) or the like, for discussion purposes, the illustration shows the mobile device 16 is in the form of a handset. The handset embodiment of the mobile device 16 functions as a normal digital wireless telephone station. For that function, the station 16 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

Also, as shown in FIG. 1, mobile device 16 includes at least one digital transceiver (XCVR) 108, for digital wireless communications via a wide area wireless mobile communication network, although the mobile device 16 may include additional digital or analog transceivers (not shown). The transceiver 108 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." Further discussion of examples, however, will focus on LTE communication, including via an LTE implementation of transceiver 108.

In one example, transceiver 108 provides two-way wireless communication of information, such as vocoded speech samples and/or digital information, in accordance with the technology of the network 15. Such wireless communication is controlled, for example, in part by admissions control manager 160. Although depicted in FIG. 1 and described further below as programming stored in flash memory 114, some or all of manager 160 may be implemented within transceiver 108 (e.g., as firmware and/or hardwired logic). The transceiver also sends and receives a variety of signaling messages in support of the various voice and data services provided via the mobile device 16 and the communication network. Each transceiver connects through RF send and receive amplifiers (not separately shown) to an antenna 110.

The mobile device 16 further includes a microprocessor, sometimes referred to herein as the host processor 112. A processor is a circuit having elements structured and arranged to perform one or more processing functions, typically various data processing functions. Although discrete logic components could be used, the examples utilize components forming a programmable central processing unit (CPU). A microprocessor, for example, includes one or more integrated circuit (IC) chips incorporating the electronic elements to perform the functions of the CPU. The processor 112, in the example of FIG. 1, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in server computers (e.g., FIG. 5) or other user terminal computer equipment (e.g., FIG. 6).

Returning more specifically to the mobile device example of FIG. 1, the microprocessor 112 serves as the programmable controller for mobile device 16 by configuring mobile device 16 to perform various operations, for example, in accordance with instructions or programming executable by processor 112. For example, such operations may include various general operations of the mobile device 16 as well as operations related to the management of VoLTE calls and other LTE data connections. Although a processor may be configured by use of hardwired logic, typical processors in mobile devices are general processing circuits configured by execution of programming.

Depending on the type of device, the mobile device 16 stores and runs an operating system through which specific applications may be run on the device. Examples of operating systems include Android, Apple iOS (iPhone or iPad devices), Windows Mobile, RIM BlackBerry operating system, or the like. Program controlled operations, for example, may include various general operations of the mobile device 16 as well as operations related to the management of VoLTE calls and other LTE data connections, as described in greater detail herein. A flash memory 114 is used to store, for example, programming or instructions, such as an admissions control manager 160, for execution by the processor 112. In one example, admissions control manager 160 is programming or instructions that control operations related to the management of VoLTE calls and other LTE data connections, as discussed below. Manager 160 may be an application program, or part of another program, e.g. part of a phone call application or part of native VoLTE call programming. Flash memory 114 may also be used to store mobile configuration settings for different mobile applications or services executable at mobile device 16 (using processor 112). Mobile device 16 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the identification of a keyword within an image and other image processing, as described herein. Program aspects of the technology may be thought of as "products" or "articles of manufacture" typically in the form of executable code or process instructions and/or associated data that is stored on or embodied in a type of machine or processor readable medium.

At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile device 16 includes a display 122, which the microprocessor 112 controls via a display driver 124, to present visible outputs to the device user. The mobile device 16 also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 16. The microphone 102 and speaker 104 may be used as additional user interface elements, for audio input and output, including with respect to related functions. Such user interface elements may be used, for example, when a user initiates a connection (e.g., voice call, video call, other data communication) which triggers the enhanced admissions control procedures described herein.

The structure and operation of the mobile communication network 15 and mobile device 16, as outlined above, were described to by way of example, only.

FIG. 2 is a flow diagram of an example of messages exchanged between a mobile device and a wireless network node, such as those found in the system of FIG. 1.

In one example, before mobile device 16 can establish a connection through mobile network 15 via eNodeB 17 to exchange communications, mobile device 16 sends a random access preamble message to eNodeB 17 to request radio resources to support the communication in step 202. Such random access preamble, as well as various other messages described herein, is defined in the $3^{rd}$ Generation Partnership Project (3GPP) LTE Evolved Universal Terrestrial Radio Access (E-UTRA) Medium Access Control (MAC) protocol specification 3GPP TS 36.321 version 11.5.0 Release 11, incorporated by reference in its entirety. The random access preamble is, for example, a request by mobile device 14 for radio resources provided by eNodeB 17 so that mobile device 14 may establish a connection through mobile network 15 to exchange information.

In step 204, eNodeB 17 sends, for example, a random access response (RAR) to mobile device 16. Based on utilization of eNodeB 17, contents of the RAR provide mobile device 16 an indication of how mobile device 16 should proceed. Contents of the RAR are described in greater detail below in relation to FIGS. 3-4. In a first example, if utilization of eNodeB 17 is below a threshold, the RAR contains an Uplink (UL) Grant based on the LTE standard. The UL Grant defines, for example, the radio resources to be used by mobile device 16 to access eNodeB 17. The RAR, in this first example, may also contain an optional backoff indicator (BI), but such BI would be zero (0) indicating mobile device 16 can utilize the radio resources defined in the UL Grant without any delay.

In a second example, if utilization of eNodeB 17 exceeds the threshold, the RAR contains the BI with a non-zero value indicating mobile device 16 will delay requesting access to network 15 via eNodeB 17 for a period of time based on the BI value. In this second example, the UL Grant field of the RAR is empty. In other words, eNodeB 17 declines to provide radio resources to mobile device 16 and eNodeB 17 indicates how long mobile device 16 will wait before requesting radio resources again.

In each of these first and second examples, eNodeB 17 either provides radio resources to mobile device 16 or declines providing radio resources and informs mobile device 16 how long to wait based solely on the utilization of eNodeB 17. Neither of these examples, however, account for whether the attempted request is related to supporting VoLTE. Both of these examples are based on the LTE standard.

In a third example, if utilization of eNodeB 17 exceeds the threshold, the RAR contains the BI with a non-zero value indicating mobile device 16 will delay requesting access to network 15 via eNodeB 17 for a period of time based on the BI value. In this third example, however, the RAR also contains an indication that mobile device 16 may override the BI and continue to request access to network 15 via eNodeB 17 without delay if the request is related to supporting VoLTE. The override indicator is, for example, a particular bit within a field of the RAR. In one example, the field is the UL Grant field. That is, in this third example, the RAR contains both the BI and a modified UL Grant. While the RAR, in this third example, is based on the LTE standard, the modified UL Grant is no longer fully LTE standard compliant because one of the bits of the UL Grant has been changed to indicate mobile device 16 may override the BI. Despite the changed bit, the modified UL Grant still defines radio resources mobile device 16 may use to access network 15 via eNodeB 17. However, if mobile device 16 does continue to access network 15 via eNodeB 17 using radio resources provided in the modified UL Grant, such access will only be on a best effort basis with the understanding that utilization of eNodeB 17 currently exceeds the threshold. In this way, admission control by a wireless network node of network 15, such as eNodeB 17, is enhanced to allow a VoLTE call even if utilization of the network node exceeds a threshold.

In a further example, when mobile device 16 continues to access network 15 via eNodeB 17 using the radio resources provided in the modified UL Grant, eNodeB 17 may drop an existing best effort data connection. That is, even though the continued access for the VoLTE call will be best effort, the eNodeB 17 may limit other existing connections to improve the ability of eNodeB 17 to provide such best effort to the VoLTE call. In this example, such dropping of an existing best effort data connection may be triggered by an additional threshold. Thus, the VoLTE call is allowed even if utilization of the network node exceeds a first threshold and an existing best effort data connection is also dropped if utilization of the network node exceeds a second threshold. In this way, not only can a VoLTE call be made if the network is over utilized, but the network will try to improve the best effort support for such a VoLTE call.

In step 206, for example, if the RAR contains a UL Grant or a modified UL Grant (and the call is a VoLTE call), mobile device 16 will proceed to connect to network 15 via eNodeB 17 by sending a connection request using the radio resources defined in the UL Grant or the modified UL Grant. In step 208, network 15 sends, for example, a connection response via eNodeB 17 and, in step 210, mobile device 16 establishes a default connection with network 15 via eNodeB 17 using the radio resources indicated in the grant. Once the default connection is established, mobile device 16 establishes a VoLTE connection through network 15 via eNodeB 17. In one example, if the connection between mobile device 16 and eNodeB 17 uses radio resources defined by a modified UL Grant, the established VoLTE connection will only be provided through network 15 via eNodeB 17 using a best effort quality of service (QoS).

Figure 3:
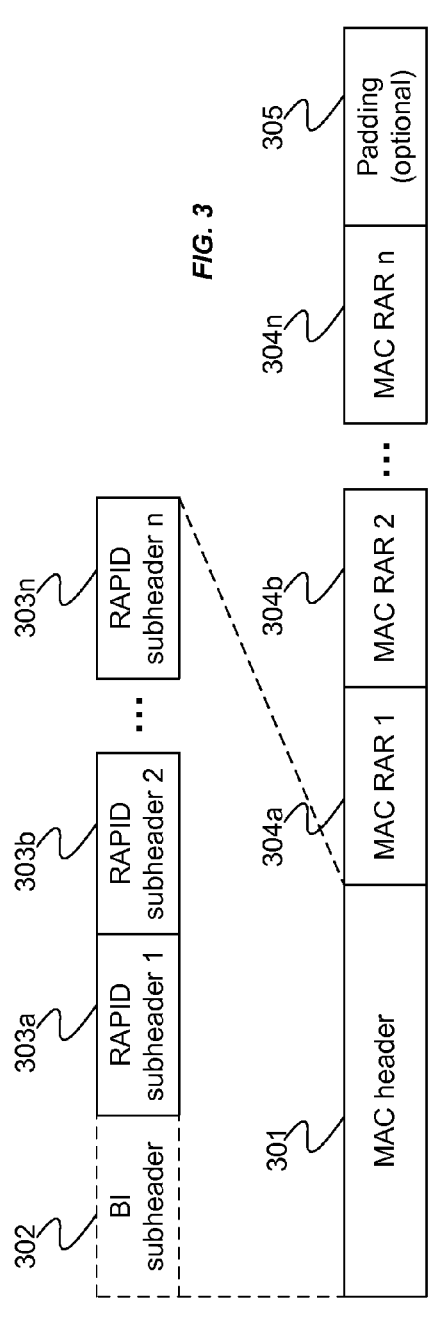
FIG. 3 is a functional block diagram of an example of a random access response as might be included in the message exchange of FIG. 2.

FIG. 3 is a functional block diagram of an example of a random access response as might be included in the message exchange of FIG. 2. The RAR includes, for example, a MAC header 301, zero or more MAC RARs 304a, 304b, 304n, and optional padding 305. The MAC header 301 includes, for example, an optional BI subheader 302 and zero or more random access preamble identifier (RAPID) subheaders 303a, 303b, 303n. Each RAPID subheader 303a, 303b, 303n corresponds, for example, to one MAC RAR 304a, 304b, 304n. That is, if there are 3 MAC RARs, there will be 3 RAPID subheaders. The contents of each MAC RAR is discussed in greater detail below in relation to FIG. 4.

As discussed above, the RAR is utilized to provide an indication of utilization of eNodeB 17 to mobile device 16. If utilization of eNodeB 17, for example, does not exceed a threshold, the RAR will include at least one RAPID subheader in MAC header 301 and at least one MAC RAR. Because radio frequencies are broadcast in nature, if multiple mobile devices are requesting access, MAC RARs for each device may be included in the RAR. Thus, each MAC RAR corresponds to a particular mobile device (e.g., RAPID subheader 303a corresponds to MAC RAR 304a which corresponds to mobile device A, RAPID subheader 303b corresponds to MAC RAR 304b which corresponds to mobile device B, RAPID subheader 303n corresponds to MAC RAR 304n which corresponds to mobile device N). Such correspondence is based on each RAPID value within each RAPID subheader. In this example, the optional BI subheader 302 may also be included, but will contain a zero (0) value.

If utilization of eNodeB 17, for example, exceeds the threshold, the RAR will include a BI subheader 302 with a non-zero value in the MAC header 301 and zero MAC RAR. Alternatively, based on the enhanced admission control for VoLTE procedures described herein, the RAR will include a BI subheader 302 with a non-zero value in the MAC header 301 and one or more MAC RARs including a modified UL Grant, as described above and discussed in greater detail below in relation to FIG. 4. In a further example, two utilization thresholds are maintained. When utilization exceeds a first threshold, eNodeB 17, for example, implements the enhanced admission control and provides a BI along with a modified UL Grant. When utilization exceeds a second threshold, however, eNodeB 17, for example, provides only the BI and mobile device 16 delays requesting a connection regardless of the type of service the mobile device is calling for.

Figure 4:
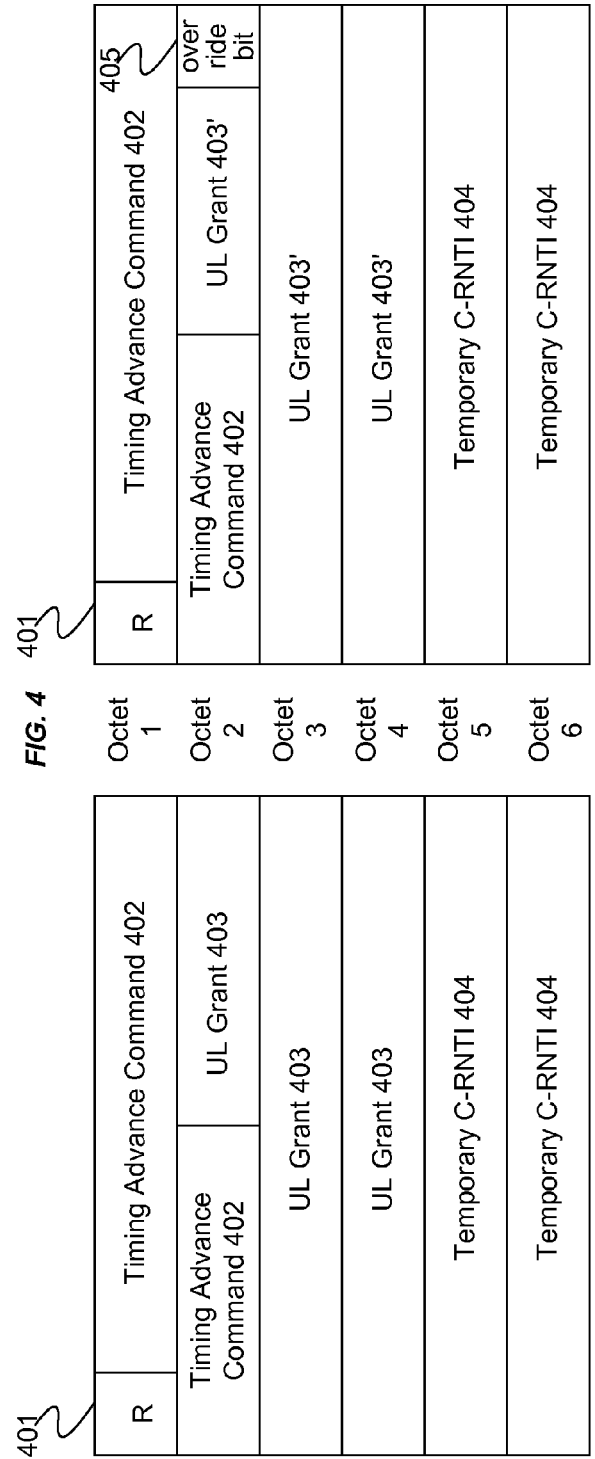
FIG. 4 is a functional block diagram of an example of two random access response payloads as might be included in the random access response of FIG. 3.

FIG. 4 is a functional block diagram of an example of two random access response payloads as might be included in the random access response of FIG. 3 under somewhat different circumstances. On the left is a MAC RAR, for example, including a UL Grant field 403 based on the LTE standard. On the right is a MAC RAR, for example, including a modified UL Grant field 403' including an override bit 405 indicating mobile device 16 may override the BI subheader 302 if the connection is for VoLTE. The UL Grant field 403 and modified UL Grant field 403' are, for example, 20 bits in length. The MAC RAR also includes, for example, a reserved bit field 401, an 11 bit timing advance command field 402, and a 16 bit temporary cell radio network temporary identifier (C-RNTI) field 404. The timing advance command field 402 indicates the index value used to control the amount of timing adjustment mobile device 16 has to apply. The temporary C-RNTI field 404 indicates the temporary identity that is used by mobile device 16 during random access. As discussed above, the UL Grant field 403 and modified UL Grant field 403' indicate the radio resources to be used by mobile device 16 on the uplink to eNodeB 17.

The override bit 405 is a selected bit from a UL Grant field 403 whose value has been changed (e.g., from 0 to 1 or from 1 to 0) to create a modified UL Grant field 403'. Although the example of FIG. 4 depicts override bit 405 as the 4$^{th}$ bit of the modified UL Grant field 403', no such requirement exists. In one example, override bit 405 is any one bit within modified UL Grant field 403' that, when changed, provides an indication to mobile device 16 that mobile device 16 may override the value of the BI subheader 302 when mobile device 16 is establishing a VoLTE connection. An eNodeB, such as eNodeB 17, and a mobile device, such as mobile device 16, that will utilize the enhanced admission control function should be configured to perform their respective override functions based on a location of override bit 405 within field 403 being commonly understood between the eNodeB and the mobile device. eNodeB 17 and mobile device 16 may commonly understand the common configuration location of override bit 405 as a result of a predetermined configuration stored into them at the time of their respective manufacturing, a dynamic instruction (that may change to accommodate other uses of bit locations within grant field 403) sent from either the eNodeB or the mobile device to the other, an instruction from a component of network 15, or an instruction or message that either the eNodeB or mobile device may receive from a user interface of, or operationally connected to, the eNodeB, mobile device, or other network device (e.g., provisioning performed by the operator of network 15).

As shown by the description above, a variety of the VoLTE admission control related functions may be implemented on servers and/or wireless network nodes. Although special-built hardware may be used, server and/or wireless network functions often are implemented by appropriate programming to configure one or more general-purpose computer platforms that have interfacing to support communications via the particular network(s).

FIG. 5 provides a functional block diagram illustration of a general purpose computer hardware platform. More specifically, FIG. 5 illustrates a network or host computer platform, as may typically be used to implement a server, such as MME 52 and/or any of the other servers/platforms implementing the enhanced connection admission control related functions shown in FIGS. 1-4. FIG. 6 depicts a computer with user interface elements, as may be used to implement a personal computer or other type of work station or terminal device, although the computer of FIG. 6 may also act as a server if appropriately programmed. FIG. 7 depicts a system with one or more wireless transceivers, as may be used to implement a wireless network node, such as eNodeB 17 in FIG. 1. It is believed that the general structure and general operation of such equipment as shown in FIGS. 5-7 should be self-explanatory from the high-level illustrations.

A server, for example, includes a data communication interface for packet data communication (see FIG. 5). The server also includes processor hardware implementing a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the VoLTE admission control techniques discussed herein may be downloaded and/or updated from a computer platform, for example, to configure the MME or other server (e.g. FIG. 1) or from a host computer or the like communicating with the mobile device via the network (e.g. FIG. 1).

A computer type user terminal device, such as a PC or tablet computer, similarly includes a data communication interface, CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

A wireless network node, such as an evolved node B, also includes a data communication interface, CPU, main memory and storage for data and/or programming (see FIG. 7). In addition, such wireless network node includes one or more wireless transceivers in order to provide communications services to one or more mobile devices via various radio frequencies in compliance with one or more wireless communications standards (e.g., LTE). Although FIG. 7 depicts the system enclosed within a single structure, such physical structure is not required. Alternatively, or in addition, certain components may be located, either physically or logically, within disparate elements. For example, while the wireless network node includes the data communication interface and wireless transceiver(s), processing to control such communication interfaces may be implemented by a CPU and programming stored in a memory of another device, such as MME 52.

Hence, aspects of the techniques for enhanced admissions control and related communications outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory or tangible storage media, more general terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a network interface configured for packet communications with a mobile communications network;
   a wireless transceiver configured for packet radio communications with a mobile device;
   a processor coupled to control communications of the network interface and wireless transceiver;
   a memory coupled to the processor; and
   a network radio connection manager program in the memory, wherein execution of the network radio connection manager program by the processor configures the system to implement functions, including functions to:
      receive, via the wireless transceiver and from the mobile device, a request for radio resources for use by the mobile device to establish a channel of communication between the mobile device and the wireless transceiver;
      determine whether utilization of the wireless transceiver exceeds a threshold;
      generate a response including an identification of radio resources for use by the mobile device to establish the channel of communication;
      upon determining utilization of the wireless transceiver exceeds the threshold, the function to generate the response further includes functions to:
         include in the response a delay indication for the mobile device to delay establishing the channel of communication; and
         include in the response an override indication for the mobile device to override the delay indication if the channel of communication is intended for a specific type of communication; and
      send, via the wireless transceiver and to the mobile device, the generated response.

2. The system of claim 1, wherein execution of the network radio connection manager program by the processor configures the system to implement further functions, including functions to:
   receive, via the wireless transceiver and from the mobile device, a request to establish the channel of communication without delay in support of the specific type of communication based on the override indication; and
   establish, based on best efforts, the channel of communication in support of the specific type of communication.

3. The system of claim 2, wherein the specific type of communication is voice over long term evolution (VoLTE).

4. The system of claim 1, wherein the network interface and the wireless transceiver are elements in an evolved node B (eNB).

5. The system of claim 4, wherein the processor and memory are elements in a mobility management entity coupled to the eNB via the mobile communication network.

6. The system of claim 1, wherein the implemented function to include an override indication further comprises a function to:
   modify the identification of radio resources to include the override indication.

7. The system of claim 6, wherein:
   the response generated by the system is a random access response based on a long term evolution (LTE) standard;
   the delay indication is a backoff indicator (BI) within a BI subheader of a media access control (MAC) header of the random access response, the MAC header and the BI subheader based on the LTE standard;

the identification of radio resources is an uplink (UL) grant within an UL grant field of a MAC payload of the random access response, the MAC payload and the UL grant field based on the LTE standard; and the override indication is a bit of the UL grant modified from a format of a UL grant based on the LTE standard.

8. A mobile device, comprising:

a wireless transceiver configured for radio packet communications;

a processor coupled to the wireless transceiver;

a memory coupled to the processor; and a mobile device radio management program in the memory, wherein execution of the mobile device radio management program by the processor configures the mobile device to implement functions, including functions to:

send, via the wireless transceiver, a request for radio resources for use by the mobile device to establish a channel of communication between the mobile device and a wireless transceiver of a mobile communications network;

receive, from the wireless transceiver of the mobile communications network, a response including:

an identification of radio resources for use by the mobile device to establish the channel of communication;

a delay indication, based on utilization of the wireless transceiver of the mobile communications network exceeding a threshold, for the mobile device to delay establishing the channel of communication; and an override indication for the mobile device to override the delay indication if the channel of communication is intended for a specific type of communication.

9. The mobile device of claim 8, wherein execution of the mobile device radio management program by the processor configures the mobile device to implement a further function to:

send, subsequent to receiving the response and without delay, a request to establish the channel of communication in support of the specific type of communication based on the override indication.

10. The mobile device of claim 9, wherein the specific type of communication is voice over long term evolution (VoLTE).

11. The mobile device of claim 8, wherein the received response is in a standardized format and the override indication is contained within a standardized field of the response.

12. The mobile device of claim 11, wherein the standardized field containing the override indication also contains the identification of radio resources.

13. The mobile device of claim 12, wherein the override indication is a modified bit of the identification of radio resources.

14. The mobile device of claim 13, wherein:

the standardized format is based on a long term evolution (LTE) standard;

the received response is a random access response based on the LTE standard;

the delay indication is a backoff indicator (BI) within a BI subheader of a media access control (MAC) header of the random access response, the MAC header and the BI subheader based on the LTE standard;

the standardized field containing the override indication and the identification of radio resources is an uplink (UL) grant field of a MAC payload of the random access response, the MAC payload and the UL grant field based on the LTE standard;

the identification of radio resources is an UL grant based on the LTE standard; and the override indication is a bit of the UL grant modified from a format of an UL grant based on the LTE standard.

15. An article of manufacture, comprising:

computer readable medium; and programming embodied in the computer readable medium, wherein execution of the programming by a processor coupled to a wireless transceiver of a mobile communications network configures the processor to implement functions, including functions to:

receive, via the wireless transceiver and from a mobile device, a request for radio resources for use by the mobile device to establish a channel of communication between the mobile device and the wireless transceiver;

determine whether utilization of the wireless transceiver exceeds a threshold;

generate a response including an identification of radio resources for use by the mobile device to establish the channel of communication;

upon determining utilization of the wireless transceiver exceeds the threshold, the function to generate the response further includes functions to:

include in the response a delay indication for the mobile device to delay establishing the channel of communication; and include in the response an override indication for the mobile device to override the delay indication if the channel of communication is intended for a specific type of communication; and send, via the wireless transceiver and to the mobile device, the generated response.

16. The article of manufacture of claim 15, wherein execution of the programming by the processor configures the processor to implement further functions, including functions to:

receive, via the wireless transceiver and from the mobile device, a request to establish the channel of communication without delay in support of the specific type of communication based on the override indication; and establish, based on best efforts, the channel of communication in support of the specific type of communication.

17. The article of manufacture of claim 16, wherein the specific type of communication is voice over long term evolution (VoLTE).

18. The article of manufacture of claim 15, wherein the wireless transceiver is an element in an evolved node B (eNB).

19. The article of manufacture of claim 15, wherein the implemented function to include an override indication further comprises a function to:

modify the identification of radio resources to include the override indication.

20. The article of manufacture of claim 19, wherein:

the response is a random access response based on a long term evolution (LTE) standard;

the delay indication is a backoff indicator (BI) within a BI subheader of a media access control (MAC) header of the random access response, the MAC header and the BI subheader based on the LTE standard;

the identification of radio resources is a uplink (UL) grant within a UL grant field of a MAC payload of the random access response, the MAC payload and the UL grant field based on the LTE standard; and the override indication is a bit of the UL grant modified from a format of a UL grant based on the LTE standard.

* * * * *